F. W. KREMER.
TUBE VULCANIZER.
APPLICATION FILED MAR. 1, 1912.
1,158,509.
Patented Nov. 2, 1915.
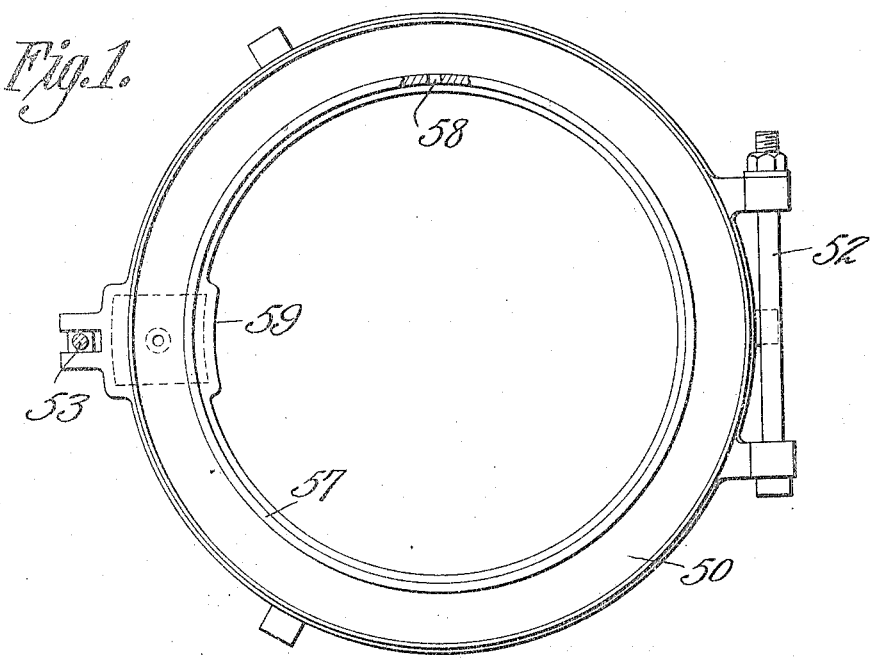
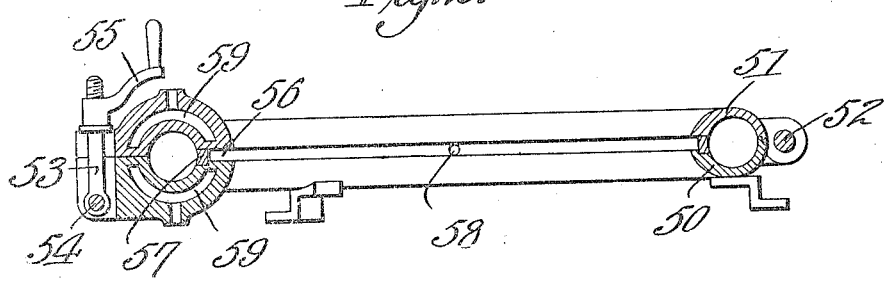
Witnesses
F. W. Kremer, Inventor.
by
Attorneys

UNITED STATES PATENT OFFICE.

FRANKLIN W. KREMER, OF RUTHERFORD, NEW JERSEY.

TUBE-VULCANIZER.

1,158,509.

Specification of Letters Patent.

Patented Nov. 2, 1915.

Original application filed July 19, 1910, Serial No. 572,725. This application filed March 1, 1912. Serial No. 680,901.

*To all whom it may concern:*

Be it known that I, FRANKLIN W. KREMER, a citizen of the United States, residing at Rutherford, in the county of Bergen and State of New Jersey, have invented a new and useful Tube-Vulcanizer, of which the following is a specification.

The device herein disclosed, is a tube vulcanizer, the present application containing matter divided out of my prior application for Letters Patent upon a method of splicing rubber tubing, Serial No. 572,725, filed upon the 19th day of July 1910.

In the application above referred to, a means is shown whereby the tube may be spliced or patched adjacent the valve stem. In the said application, however, no means is shown whereby a tube may be spliced or patched at a point remote from the valve stem. The present application discloses a means whereby a tube may be spliced or patched at a point remote from the valve stem, the heat necessary to vulcanize the tube being applied to a limited cross sectional area of the tube only, thereby preventing an over-curing of the entire tube.

The present invention, broadly considered, aims to provide a mold having a heating chamber of limited extent, and to provide a shiftable member upon the mold, the shiftable member carrying the valve stem, so that the tube may be moved circumferentially in the mold to position the portion of the tube which is to be spliced or patched, adjacent the limited heating chamber.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in top plan; and Fig. 2 is a transverse section.

The mold herein disclosed is intended to receive the entire tube so as to permit it to be inflated throughout its entire extent. This mold consists of a lower section 50 and an upper section 51, the said sections being circular in outline and semi-circular in cross section. The upper and lower sections 51 and 50 are hinged together as indicated at 52 and are adapted to be locked in closed position by any suitable means such as a rod 53 which is fulcrumed upon the lower section at 54, the rod having a screw crank 55 at its upper end, adapted to engage the upper section of the mold. The mold is formed with an open groove 56 in its inner circumference and this groove 56 is closed by means of a rotary ring 57 mounted in suitable rabbeted portions of the upper and lower sections of the mold. The ring 57 at one point is provided with an opening 58 to receive the valve stem of the tube. At one point in its circumference, each of the sections 50 and 51 is provided with a heating chamber 59 by means of which the portion of the tube to be vulcanized can be heated.

In practical operation, the tube which is to be spliced or patched is placed between the mold sections 50 and 51, the immediate point to be spliced or patched being located within the steam chamber 59. The ring 57 can be rotated so as to adjust itself to the position of the valve stem of the tube, the valve stem of the tube protruding through the opening 58 in the ring. The tube is inflated through the valve stem, and the portion of the tube to be spliced or patched is vulcanized in the chamber 59.

From the foregoing it will be obvious that any portion of the tube may be located within the chamber 59, irrespective of the relative positions between such portion of the tube and the valve stem of the tube, the shiftable ring 57 permitting the desired portion of the tube to be positioned in the chamber 59. A limited area of the tube may, therefore, be vulcanized while inflated, independently of the location of the valve stem.

Having thus described the invention, what is claimed is:—

In a tube vulcanizing apparatus, a mold comprising coöperating members and having an opening at one side; and a closure mounted to slide in the opening, circumferentially of the mold, the closure having an opening; each member of the mold having a transverse heating chamber, both ends of each chamber being disposed close to the abutting faces of the mold members thereby to afford a heated area substantially co-extensive with the transverse circumference of the mold, and to permit a treating of transversely spaced tube defects without opening the mold in inverting the tube therein.

In testimony that I claim the foregoing as my own, I have hereto affixed my signature in the presence of two witnesses.

FRANKLIN W. KREMER.

Witnesses:
SELINA WILLSON,
ERNEST F. RILEY